United States Patent [19]

Tatsuguchi

[11] 3,808,360

[45] Apr. 30, 1974

[54] TAPE TENSION CONTROL SYSTEM IN A RECORDING AND REPRODUCING APPARATUS

[75] Inventor: Kazuo Tatsuguchi, Yokohama, Japan

[73] Assignee: Victor Company of Japan, Ltd., Yokohama-city, Japan

[22] Filed: Dec. 23, 1971

[21] Appl. No.: 211,338

[30] Foreign Application Priority Data

Dec. 31, 1970 Japan .............................. 45-128374

[52] U.S. Cl. ..... 178/6.6 P, 178/6.6 A, 179/100.2 S, 179/100.2 T

[51] Int. Cl. .............................................. H04n 5/78

[58] Field of Search ....................... 178/6.6 A, 6.6 P; 179/100.2 S, 100.2 T

[56] References Cited

UNITED STATES PATENTS

| | | | |
|---|---|---|---|
| 3,686,432 | 8/1972 | Deguchi et al. | 178/6.6 P |
| 3,665,098 | 5/1972 | Yano et al. | 179/100.2 S |
| 3,378,646 | 4/1968 | Shashoua et al. | 179/100.2 T |
| 3,535,441 | 10/1970 | Grace | 178/6.6 P |

*Primary Examiner*—James W. Moffitt

[57] ABSTRACT

A number of sequential control pulses are successively and uniformly recorded on a magnetic video tape recording. On the opposite sides of the video recording and reproducing head are supplemental heads which detect the control pulses. The tape transport capstan is driven at a speed which always maintains a predetermined number of the control pulses on the tape segment between the supplemental heads. This capstan speed compensates for any tape stretch or shrinkage.

10 Claims, 6 Drawing Figures

INVENTOR.
KAZUO TATSUGUCHI
BY
Louis Bernat
ATTY.

INVENTOR.
KAZUO TATSUGUCHI
BY
Louis Bernat
ATTY.

PATENTED APR 30 1974 3,808,360

SHEET 3 OF 5

INVENTOR.
KAZUO TATSUGUCHI
BY
Louis Bernat
ATTY.

PATENTED APR 30 1974 3,808,360

INVENTOR.
KAZUO TATSUGUCHI
BY
Louis Bernat
ATTY.

INVENTOR.
KAZUO TATSUGUCHI
BY
Louis Bernat
ATTY.

TAPE TENSION CONTROL SYSTEM IN A RECORDING AND REPRODUCING APPARATUS

This invention relates to a tape tension control system in a magnetic recording and reproducing apparatus, and more particularly, to a system for controlling the tension of a magnetic tape running in the neighborhood of a recording and reproducing magnetic head, so as to maintain a constant tension during recording time and during reproducing time.

A known system for controlling the tension of a tape detects the amount of a skew error which causes bending in the upper end portion of a reproduced TV picture. A horizontal synchronizing signal in a reproduced video signal is used to control the tension of the tape, by this amount of error. This prior art system has disadvantages in that no attention is paid to the controlling of the tension of the tape, so as to maintain it constant during a recording of a desired information signal. It is incapable of maintaining a constant tension of the tape during recording.

Another known system attempts to maintain a constant tension of the tape by providing two capstans, driving one of the capstans at a constant speed and driving the other at a constant torque, thereby to obtain a constant tension of the tape between the two capstans. This prior art system also has disadvantages in that it lacks means for detecting the amount of tension during reproduction. When a permanent stretch or shrinkage occurs in the tape (due to a change of temperature, humidity, or other factors) a DC skew takes place, and it is impossible to correct it later.

It is, therefore, a general object of the present invention to provide a novel and useful tape tension control system, in a recording and reproducing apparatus, which has eliminated the aforementioned disadvantages of the conventional systems.

Another object of the invention is to provide a system in which the tension of the tape is controlled to maintain it constant during recording. This control of the tension of the tape is accomplished by controlling the running of the tape so as to maintain a constant number of control signals on the magnetic tape between two magnetic heads which are provided for control signals.

A further object of the invention is to provide a system in which the tension of the tape is controlled so that the tension of the tape during reproducing is the same as the tension during recording.

According to the system of this invention, a permanent stretch or shrinkage of the tape (which may take place during storage) will not adversely affect recording and reproducing of the tape because the tension of the tape is properly controlled. Thus, the apparatus employing the system according to the invention is capable of a stable recording and reproducing of a video information, without producing a skew distortion.

Other objects and features of the invention will become apparent from the description made hereinbelow, with reference to the accompanying drawings, in which.

First, one embodiment of a magnetic recording and reproducing apparatus, to which the system according to the invention is applicable, will be described with reference to FIG. 1.

Figures 1, 2:
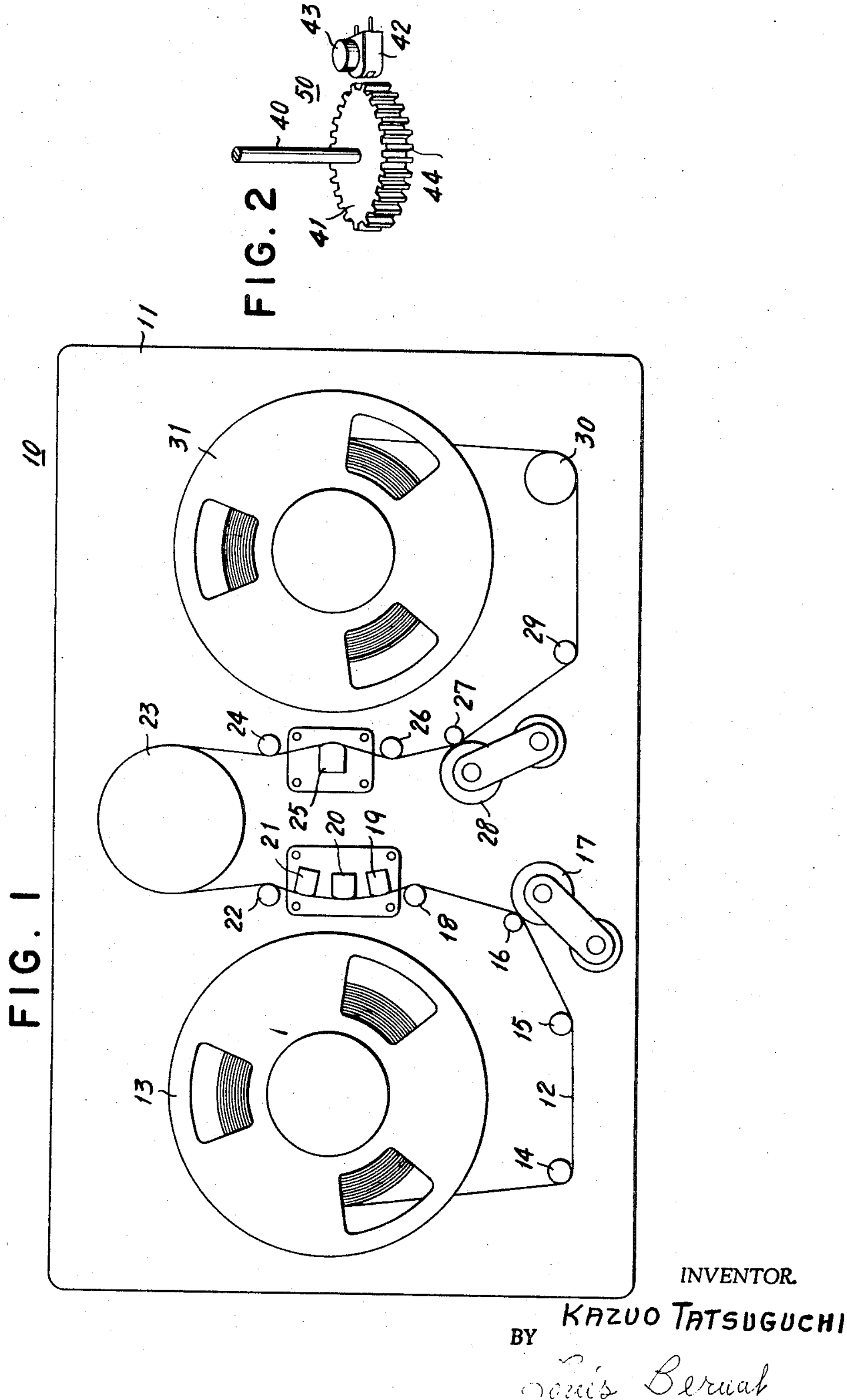
FIG. 1 is a schematic plan view of one embodiment of a magnetic recording and reproducing apparatus to which the system according to the invention is applicable.
FIG. 2 is a perspective view of a capstan rotation detector.

FIG. 1 is a plan view of a part of a magnetic video recording and reproducing apparatus 10, which appears above a top panel 11. The apparatus will be described in the order of the running path of a magnetic tape. A magnetic tape 12 is supplied from a supply reel 13, guided by guide poles 14 and 15, and held between and driven by a speed control capstan 16 and a pinch roller 17. The magnetic tape 12, after being guided by a guide pole 18, is brought into contact with an erasing magnetic head 19, an audio magnetic head 20, and a control signal recording and reproducing magnetic head 21.

During recording, an information signal previously recorded on the magnetic tape 12 is erased by the erasing magnetic head 19 which erases the whole width of the tape. Audio signals are recorded on one edge portion of the tape, by the audio magnetic head 20. Control signals are recorded on the other edge portion of the tape by the control signal recording and reproducing magnetic head 21. During reproducing, the control signals which are recorded on the magnetic tape 12 are reproduced by the magnetic head 21.

The magnetic tape 12, after being guided by a guide pole 22, advances toward a guide drum 23 at a predetermined direction. The guide drum 23 comprises upper and lower guide drum halves, spaced apart from each other with a gap of a predetermined distance formed therebetween. Two rotary video magnetic heads (not shown) are mounted for rotating in the gap between the two guide drum halves. The magnetic tape 12 is guided by guide poles 22 and 24 so that the are of the winding of the magnetic tape 12 around the guide drum 23 is limited to approximately 190°. The longitudinal wrap direction of the tape is helical relative to the gap of the guide drum 23. Accordingly, video signals are recorded or reproduced by the video magnetic heads mounted in the guide drum 23. A plurality of parallel tracks are formed obliquely across the width of the tape relative to the longitudinal direction of the magnetic tape 12.

The magnetic tape 12 guided by the guide pole 24 is brought into contact with the control signal reproducing magnetic head 25, which reproduces the control signal recorded by the control signal recording and reproducing magnetic head 21. Then, the magnetic tape 12 is guided by a guide pole 26 and is driven by a capstan 27, which is provided for controlling the tension of the tape, and a pinch roller 28. The magnetic tape 12 is further guided by a guide pole 29 and a tape counter roller 30 to a take-up reel 31.

An outline of the tape tension controlling operation in this apparatus will be described next. The capstan 16 is rotated at a constant speed in synchronization with a video signal, to be recorded by means of the video magnetic heads in the guide drum 23. The capstan 16 drives the magnetic tape 12, which runs at a constant speed. Either synchronizing signal of the video signal to be recorded or a signal obtained by detecting the rotational phase of the rotary video magnetic heads is recorded by the control magnetic head 21 on the magnetic tape 12. This is a reference and control signal. During playback, this recorded control signal is reproduced by the control signal reproducing magnetic head 25. The phase of the recorded and reproduced control signal is compared with the phase of the control signal to be recorded and the rotational speed of the capstan 27 is controlled so that a constant number (not necessarily an integer) of the control signals to be recorded on the portion of the magnetic tape 12 extending between the magnetic heads 21 and 25 is always accurately maintained.

The tension of the magnetic tape portion extending between the magnetic heads 21 and 25 can be controlled by increasing or decreasing the number of the control signals recorded on this magnetic tape portion. Accordingly, the tension of this magnetic tape portion is maintained constant by maintaining a constant number of the control signals recorded on this magnetic tape portion. constant. The tension of this magnetic tape portion is controlled by a motor for the capstan 27. A controlled speed of the motor causes the phase of the control signals reproduced by the magnetic head 25 to lead or lag, thereby to maintain a constant number of the control signals on this magnetic tape portion.

During reproducing, the rotation of the capstan 16 is controlled by the control signal reproduced by the magnetic head 21. Thus, the capstan 16 drives the magnetic tape 12 at the same speed as during recording. On the other hand, the rotation of the capstan 27 is controlled responsive to the output of a phase comparing means operated jointly by the control signal reproduced by the magnetic head 21 and the control signal reproduced by the magnetic head 25. Accordingly, there always is a constant number of control signals, recorded on the magnetic tape portion extending between the magnetic head 21 and the magnetic head 25. Capstan 27 is controlled so that the number during reproducing is the same as the number during recording. As a result, the tension of the magnetic tape during reproducing is controlled so that it is the same as the tension during recording. In the event that a permanent stretch or shrinkage occurs on the magnetic tape 12, the tension of the tape during reproducing will be controlled by the above described controlling operation.

Next to be described is a first embodiment of the above described invention.

Figure 3:
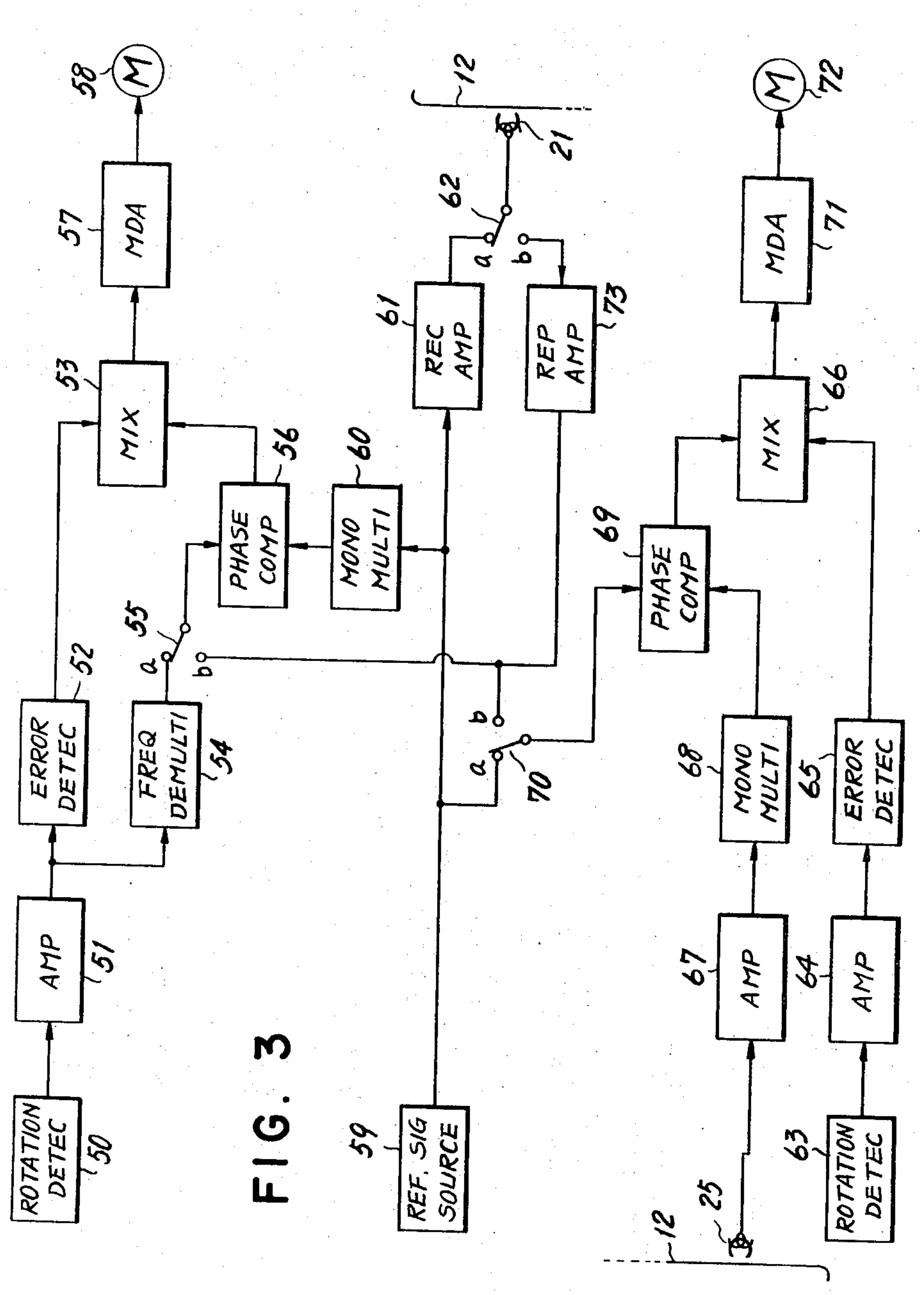
FIG. 3 is a block diagram of one embodiment of the system according to the invention.

FIG. 2 is a perspective view of one embodiment of a capstan rotation detector 50 which is used as part of the block diagram of one embodiment of the control system, according to the invention as shown in FIG. 3. A flywheel 41 is fixedly mounted on the lower end of the shaft 40 of the capstan 16. The flywheel 41 has 120 teeth 44 on the outer periphery thereof. A magnetic head 42 is positioned adjacent the teeth for detecting the rotation of the capstan 16 and the flywheel 41. A permanent magnet 43 is fixedly mounted on the top surface of the magnetic head 42.

As the flywheel 41 is rotated and each one of the projecting teeth 44 reaches a position where it is opposed to the gap of the magnetic head 42, a closed magnetic circuit is formed passing through the head core of the magnetic head 42 and the adjacent projecting tooth 44. This increases the flux from the magnet 43. When one of the recesses of the teeth 44 has reached a position where it is opposed to the gap of the magnetic head 42, the magnetic circuit is opened, and the flux from the magnet 43 decreases. Thus, the flux passing through the head core of the magnetic head 42 increases and decreases responsive to the rotation of the flywheel 41, whereby electrical signals are obtained from a coil wound on the head core of the magnetic 42.

Accordingly, each time when one of the projecting teeth 44 passes before the magnetic head 42, a signal is obtained, in sequence.

In the present embodiment, the capstan shaft 40 is rotated at a rotational speed of 7.5 revolutions per second. The rotation signal of $120 \times 7.5 = 900$ (Hz) is detected.

The operation of the embodiment of the control system during recording will be described next. In FIG. 3, the signal which has been obtained by the capstan rotation detector 50 (FIG. 2) in response to the rotation of the capstan 16 is amplified and formed into a square wave in an amplifier 51. The amplified signal is supplied to a speed error detection circuit 52 and a frequency demultiplier 54. The speed of the capstan 16 is detected in the error detection circuit 52, and an output speed error voltage of the error detection circuit 52 is supplied to a mixer 53.

In the meanwhile, the signal supplied to the frequency demultiplier 54 is counted down in its frequency, and thereafter it is supplied to a phase comparator 56, via a mode selection switching relay 55, which is connected to a contact *a*. The frequency demultiplier 54 counts down the frequency of the signal. The output counted down frequency is equal to the frequency of a reference signal which is a synchronizing signal. This video signal may be either the one separated from the video signal to be recorded or a signal obtained by detecting the rotational speed of the rotary video magnetic head. Either way it is supplied from a reference signal source 59.

The reference signal is supplied from the reference signal source 59 to the phase comparator 56, by way of a monostable multivibrator 60, which is provided for making a tracking adjustment. In the phase comparator 56, the phase of the signal from the frequency demultiplier 54 and the phase of the signal from the monostable multivibrator 60 are compared with each other and with an output phase error signal of the phase comparator 56 as supplied to the mixer 53.

Circuit 53 mixes the speed error voltage from the speed error detection circuit 52 and the phase error voltage from the phase comparator 56. The output of the mixer 53 is amplified in a motor driving amplifier 57, for power amplification, and supplied to a capstan motor 58 for the capstan 16, thereby driving the capstan motor 58 and controlling the rotation of the speed control capstan 16.

Simultaneously, the reference signal from the reference signal source 59 is amplified by a recording amplifier 61 and thereafter supplied to the control signal recording and reproducing magnetic head 21, via a mode selection switching relay contact 62 which is connected to a contact *a*. The reference signal is a control signal recorded by the magnetic head 21 on an edge portion of the magnetic tape 12.

A second rotation detector 63 is of the same construction as the above described first rotation detector 50 (FIG. 2). The second rotation detector 63 detects the rotation of the capstan 27, which is provided for controlling the tension of the tape. The output signal of the rotation detector 63 is amplified and formed into a square wave by an amplifier 64 and is supplied to a speed error detection circuit 65. A speed error voltage, with respect to the capstan 27, is obtained in the error detection circuit 65 and is supplied to a mixer 66.

In the meanwhile, the tape moves until control signal, recorded by the control signal recording and reproducing magnetic head 21, reaches the position of the control signal reproducing magnetic head 25 where it reproduces the control signal. The control signal reproduced by the magnetic head 25 is amplified in an amplifier 67 and is supplied to a monostable multivibrator 68. This monostable multivibrator 68 is capable of changing the amount of delay by any desired amount, and its output determines the tension of the tape, by adjusting the amount of delay. The reproduced control signal (as delayed by the monostable multivibrator 68) is supplied to a phase comparator 69.

The phase comparator 69 compares the phase of the reference signal supplied from the reference signal source 59 through mode selection switching relay contacts 70 (which is connected to a contact *a*) with the phase of the reproduced control signal supplied from the monostable multivibrator 68. The output phase error voltage of the phase comparator 69 is supplied to the mixer 66.

In the mixer 66, the speed error voltage from the detection circuit 65 and the phase error voltage from the phase comparator 69 are mixed together. The output from the mixer 66 is amplified in a motor driving amplifier 71 for power amplification and is supplied to a capstan motor 72 for the capstan 27. The capstan motor 72 operates and controls the rotation of the tension control capstan 27.

A constant number of the control signals recorded on the magnetic tape is always found in the tape path between the magnetic heads 21 and 25. This number is controlled by the controlling actions of the speed control capstan 16 and the tension control capstan 27. Accordingly, the tension of the magnetic tape portion between the magnetic heads 21 and 25 is maintained constant. The video signal is always recorded in the optimum condition on the portion of the magnetic tape 12 which makes contact with the guide drum 23 disposed along the tape path between the magnetic heads 21 and 25.

An operation of the system during reproducing will be described next. During reproducing, the relays 55, 62 and 70 are switched to the contact *b*. The control signal reproduced by the control signal recording and reproducing magnetic head 21 is supplied to a reproducing amplifier 73, where it is amplified. The signal from the amplifier 73 is supplied, on one hand, to the phase comparator 56 through the relay contacts 55 and, on the other hand, to the phase comparator 69 through the relay contacts 70.

In the phase comparator 56, the phase of this reproduced control signal and the phase of the reference signal supplied from the reference signal source 59 are compared with each other. As a result, an output phase error voltage is obtained. At this time, the reference signal is adjusted by the monostable multivibrator 60 so that the center of the tape running phase draws into synchronism with the phase that was recorded on the tape during the recording. The phase error voltage from the phase comparator 56 is mixed with the speed error voltage from the detection circuit 52 in the mixer 53. The output of the mixer 53 controls and drives the motor 58 in the same manner as it was driven during the recording. Thus, the rotation of the speed control capstan 16 is controlled so as to drive the magnetic tape 12 at the same speed and with the same phase as it was driven during the recording.

In the meanwhile, the phase comparator 69 compares the phase of the reproduced control signal (supplied from the magnetic head 21 through the relay contacts 70) with the the phase of the (reproduced control signal reproduced by the control signal reproducing magnetic head 25 and supplied through the amplifier 67 and the monostable multivibrator 68). The phase error voltage, which is the output of the phase comparator 69, is mixed with the speed error voltage from the detection circuit 65 in the mixer 66. The output of the mixer 66 controls and drives the motor 72 for controlling the rotation of the tension control capstan 27 to hold tape tension at the same tension that was used during recording.

Accordingly, the number of the control signals recorded on the magnetic tape portion extending between the magnetic heads 21 and 25 is controlled so that it is always the same as the number during the recording time. Therefore, at least the tape tension of the magnetic tape portion between the magnetic heads 21 and 25, during reproducing, is controlled so that it becomes equal to the tape tension of the same portion during recording.

Figure 4:
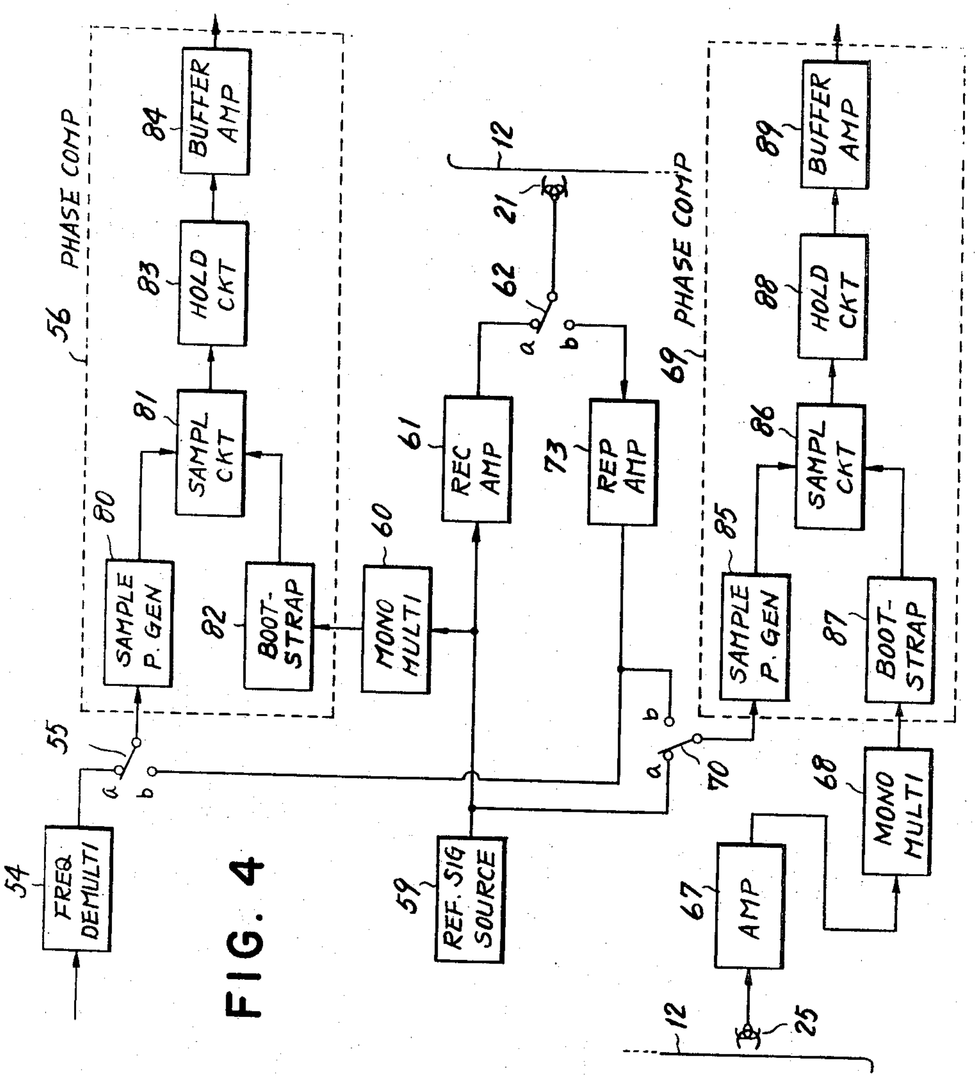
FIG. 4 is a more detailed block diagram of the essential part of the block diagram system shown in FIG. 3.

One embodiment of a more detailed bock diagram of the phase comparators 56 and 69 described with reference to FIG. 3 is shown in FIG. 4. FIG. 5(A) to FIG. 5(M) show waveforms in each component part thereof.

Figure 5:
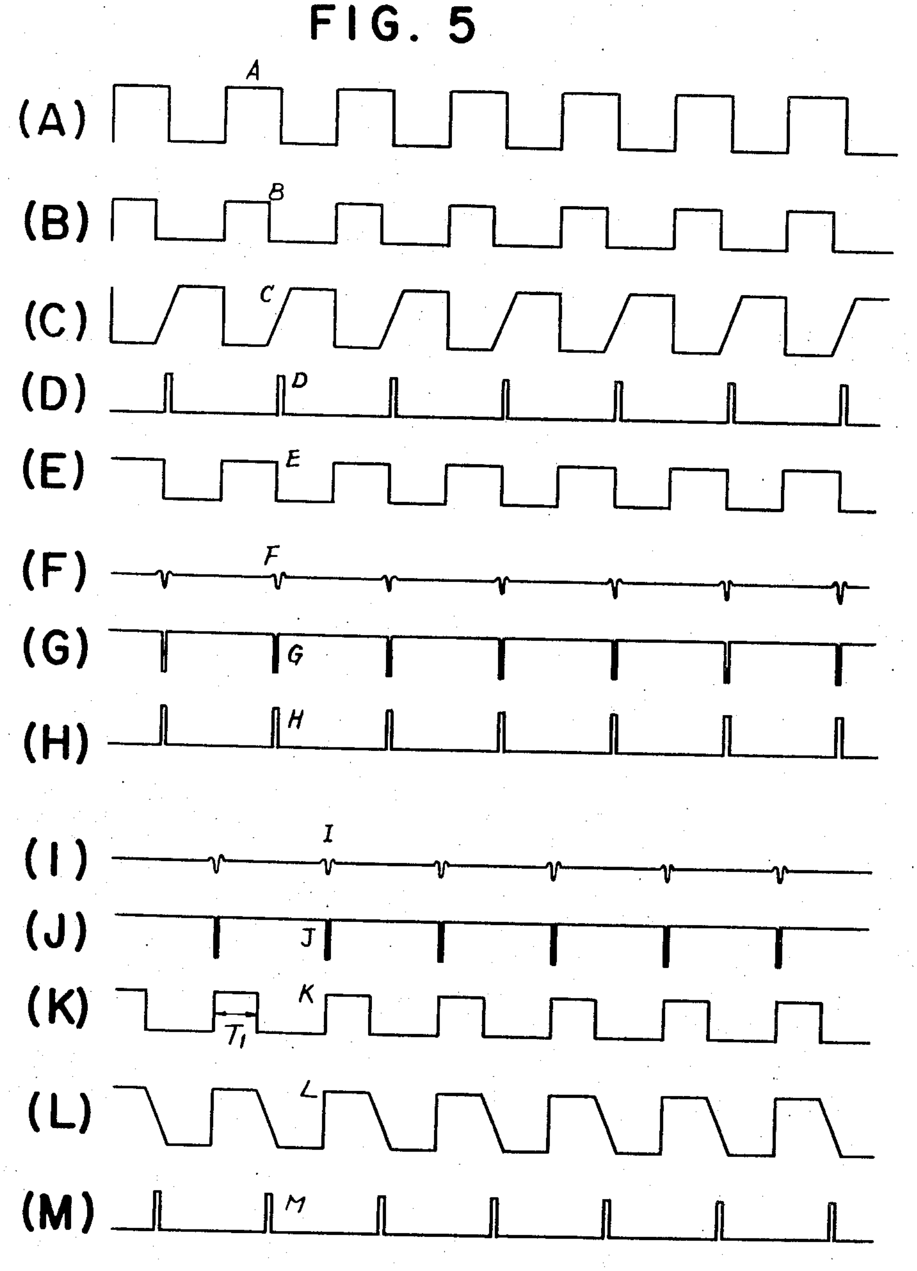
FIG. 5 is a diagram showing waveforms of signals appearing in respective parts of the block system shown in FIG. 4.

A reference signal A of a symmetrical square wave shown in FIG. 5(A) is sent from the reference signal source 59. This signal is a square wave which falls responsive to a vertical synchronizing signal of an odd number field and rises responsive to a vertical synchronizing signal of an even number field with a frequency of 30 Hz. The monostable multivibrator 60 is provided for making tracking adjustment. It is triggered at the rising of this reference signal A. The amount of the delay of the monostable multivibrator 60 is selected so that the center of the slope of trapezoidal wave C (shown in FIG. 5(C) coincides with the phase of the falling edge of the reference signal A. Waveform is formed by a bootstrap circuit 82 in the phase comparator 56. The waveform B, of the output of this monostable multivibrator 60, is shown in FIG. 5(B). The output waveform B is supplied to the bootstrap circuit 82. The rising edge of the slope of the output trapezoidal waveform signal C of the bootstrap circuit 82 is started by the falling edge of the delay side of the signal B. The degree of the inclination of the rising edge portion of the signal C gives a loop gain of a phase control servo loop. The output signal C of the bootstrap circuit 82 is supplied to a sampling circuit 81.

On the other hand, a signal of 900 Hz is obtained from the rotation detector 50 (FIG. 3) in response to the rotation of the capstan 16 this signal is counted down to one thirtieth by the frequency demultiplier 54, being made into a frequency of 30 Hz which is the same as the frequency of the reference signal A. The signal from the frequency demultiplier 54 is supplied to a sample pulse generating circuit 80 in the phase comparator 56, via the relay contacts 55.

In the sample pulse generating circuit 80, a sample pulse D is formed having a pulse width of 1 msec, as shown in FIG. 5(D) This sample pulse D is supplied to the sampling circuit 81 where the pulse D causes a sampling of the middle portion of the slope of the trapezoidal wave signal C, from the bootstrap circuit 82. As the sampling circuit 81, any of various known sampling circuits may be used. In the present embodiment, a circuit composed of diodes is used. When the rotation of the capstan 16 is a normal speed, the sample pulse D in the sampling circuit 81 samples the middle portion of the slope of the trapezoidal wave signal C.

If the rotation of the capstan 16 becomes slower than usual due, to disturbances, there is a delay in the phase of the detected rotation signal. This delay, in turn, causes a delay in the sample pulse D which is formed from this rotation signal. The delay in the phase of the sample pulse D is recognized by a shifting of the pulse D to the right in the waveform figure. At this time, the trapezoidal wave signal C does not shift. Accordingly, the pulse D samples a portion which is right of the middle of the slope, i.e. a portion of a higher voltage level than the voltage level of the center of the slope. A. voltage which is higher than usual is obtained in the foregoing manner to cause the capstan motor 58 to rotate faster. This restores the rate of rotation and the phase of the capstan 16 to the normal state.

In case the phase of rotation of the capstan 16 leads the phase in the normal state, due to disturbance, an action which is the reverse of the foregoing one is performed. Thus, the voltage sampled in the sampling circuit 81 is supplied to a hold circuit 83 where the voltage is held until a next sampled voltage comes in. This voltage is held in the hold circuit 83 from which it is then supplied to a buffer amplifier 84, in which an input impedance is high and an output impedance is low. The voltage is further supplied to the mixer 53 (FIG. 3) of the next stage, where it is mixed with the speed error voltage as has previously been described.

Owing to the servo system including the phase comparator 56 of the above described construction, the speed control capstan 16 is rotated at a constant speed and with a constant phase during recording. Thus, the control signals are recorded on the magnetic tape 12 at constant intervals.

Simultaneously, the reference signal from the reference signal source 59 is amplified in the recording amplifier 61 and made into a symmetrical square wave E shown in FIG. 5(E). This square wave E is supplied to the control signal recording and reproducing magnetic head 21, via the relay contacts 62, and it is recorded by the magnetic head 21 on the magnetic tape 12, as the control signal. This recorded control signal is reproduced by the control signal reproducing magnetic head 25. The reproduced control signal I, shown in FIG. 5(I), is supplied to the amplifier 67. The amplifier 67 comprises an amplifying circuit and a Schmitt circuit. The signal I is amplified in the amplifying circuit by about 63 dB and formed into a pulse form in the Schmitt circuit into a pulse form. The signal J, which has been formed as shown in FIG. 5(J), is supplied to the monostable multivibrator 68 to trigger it. The amount of delay in the monostable multivibrator 68 (i.e. period $T_1$ between the rising and falling edges of the output square wave K shown in FIG. 5(K)) is adjusted by the tension in the tape. If it is desirable to increase the tension of the magnetic tape, the amount of delay in the monostable multivibrator 68 is made larger and if it is desired to lessen the tension, the amount of delay is made smaller. This operation will be described more in detail, later. The output square wave K of the monostable multivibrator 68 is supplied to the bootstrap circuit 87 of the phase comparator 69.

In the bootstrap circuit 87, a trapezoidal wave signal L is formed as shown in FIG. 5(L). It which has a slope starting at the delay side, i.e., the falling edge of the square wave K. The degree of the trailing edge inclination of the trapezoidal wave signal L gives a loop gain of the tension control. This trapezoidal signal L is supplied to a sampling circuit 86.

In the meanwhile, a reference signal A from the reference signal source 59 is supplied to a sample pulse generating circuit 85 of the phase comparator 69 through the relay contacts 70. A sample pulse M (shown in FIG. 5(M)) is obtained from the sample pulse generating circuit 85. This sample pulse M is supplied to the sampling circuit 86 where it causes a sampling of the trapezoidal wave signal L from the bootstrap circuit 87. In the sampling circuit 87, the phase of the control signal reproduced from the magnetic tape 12 is compared with the phase of the reference signal.

The control signal reproducing magnetic head 25 is nearer to the take-up reel 31 (on the path of the magnetic tape 12) than the control signal recording and reproducing magnetic head 21. For this reason, in case the phase of the control signal reproduced by the magnetic head 25 leads the phase of the reference signal recorded by the magnetic head 21, the magnetic tape 12 receives a driving force which increases its tension. As the magnetic tape 12 is so driven, it tends to receive a stretching force between the magnetic heads 21 and 25, thus due to disturbance or other factors its tension increases. The phase of the control signal reproduced by the magnetic head 25 leads..

In this case, the waveform I is shifted to the left in the figure. Accordingly, the trigger pulse J formed from the waveform I, the output square wave K of the monostable multivibrator 68, and the output trapezoidal wave signal L of the bootstrap circuit 87 are all shifted, by the same amount, to the left in the figure. The sample pulse M formed from the reference signal is not changed in its phase. Accordingly, the sample pulse M samples a level portion which is lower by the amount of the leftward shift of the trapezoidal wave signal L.

A voltage is obtained in the foregoing manner which is lower than usual and operates to reduce the rotational speed of the driving motor 72 and the tension conctol capstan 27, thereby to decrease the tension of the magnetic tape 12. Thus, the magnetic tape 12 is controlled so as to run always at a constant speed. A hold circuit 88 and a buffer amplifier 89 operate in the same manner as the hold circuit 83, and the buffer amplifier 84 in the phase comparator 56 so that the description of their operations will be omitted.

The phase of the tape is so controlled that the sample pulse waveform M comes at the center of the slope of the trapezoidal wave signal L responsive to the foregoing series of servo operation. Accordingly, the delay side, (i.e. the rising side of the monostable multivibrator 68 which determines the starting position of the slope of the trapezoidal signal L) is controlled to have a constant phase relationship with respect to the phase of the sample pulse M, obtained from the reference signal. If the amount of delay in the monostable multivibrator 68 is made large, it is equivalent to a lead in the phase of the control signal reproduced by the magnetic head 25. Therefore, the tension of the magnetic tape 12 increases. If the tension of the magnetic tape 12 is to be reduced, the amount of delay in the monostable multivibrator 68 should be reduced.

During reproducing, the relay contacts 55, 62 and 70 are switched to the contact *b*. The control signal recorded on the magnetic tape 12 is reproduced by the magnetic head 21. The reproduced control signal F (shown in FIG. 5(G) is supplied to the amplifier 73, via the relay 62. The amplifier 73 is of the same construction as the amplifier 67. A signal G shown in FIG. 5(G)) is amplified and formed into a pulse form in the amplifier 73. Then it is supplied to the sample pulse generating circuit 80 via the relay contacts 55. In the sample pulse generating circuit 80, a sample pulse H is formed, as shown in FIG. 5(H). This sample pulse H causes a sampling of the trapezoidal wave signal C from the bootstrap circuit 82. The operation thereafter is the same as during recording and the description thereof is omitted.

The sample pulse is obtained responsive to the rotation signal of the capstan 16 during recording. Whereas, it is obtained by reproducing the recorded control signal during reproducing. Accordingly, during reproducing, the speed and phase of the magnetic tape can be made exactly the same as it was during recording. This is accomplished by making the frequency and the phase of the reproduced control signal coincidental with those of the reference signal.

In the meanwhile, the pulse signal G from the amplifier 73 is supplied to the sample pulse generating circuit 85 through the relay contacts 70. The phase of the tape passing by the magnetic head 21 is made coincidental with the phase during recording, because it is controlled by the servo loop including the phase comparator 56. Thus the phases of the reproduced control signal F and the pulse G, obtained therefrom, always coincide with the reference signal A. During reproducing, a pulse which is in phase with the reference signal A (i.e. the signal during recording) is supplied to the sample pulse generating circuit 85. A sample pulse H (shown in FIG. 5(H)) has a phase which is exactly the same as that of the sample pulse M used during recording. Pulse H is obtained from the sample pulse generating circuit 85. The control signal reproduced by the magnetic head 25 is irrelevant with a recording mode and a reproducing mode. Accordingly, the tension of the tape is controlled in the entirely same phase relation during reproducing, as during recording.

In the foregoing embodiment, the tension of the magnetic tape 12 is controlled so that it remains constant during recording. During reproducing, it becomes the same as it was during recording. However, the system according to the invention is not limited to this, identity of tension. It is also possible to make a recording while the tension of the tape is changed with time. In this case, the amount of delay in the monostable multivibrator (i.e. the period $T_1$ of the square wave K shown in FIG. 5(K)) may be changed with time. This kind of system is also applicable to a magnetic recording and reproducing apparatus for making a recording tape.

Figure 6:
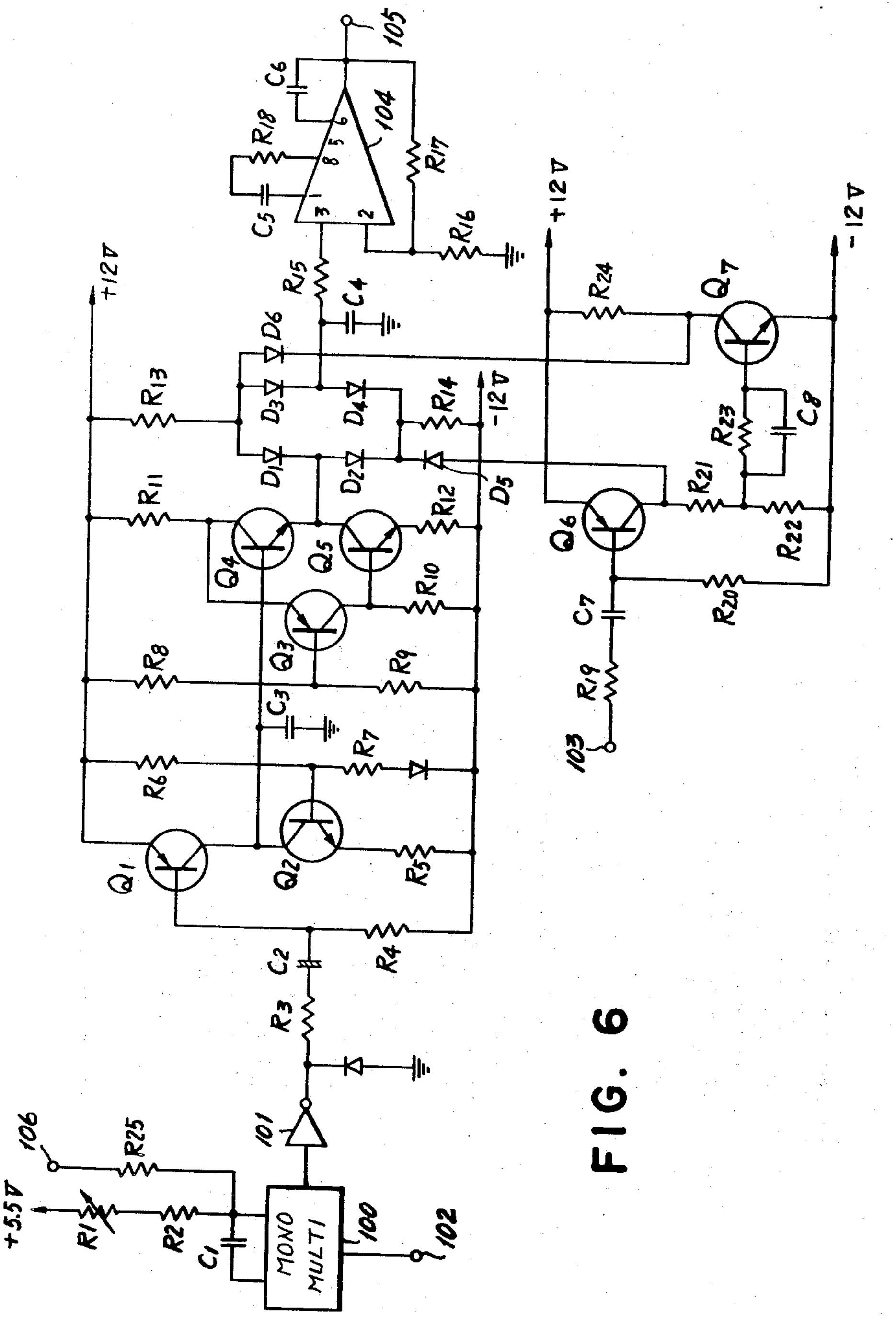
FIG. 6 is a circuit diagram showing one concrete embodiment of an electric circuit of a tension setting monostable multivibrator and a phase comparator.

FIG. 6 shows a circuit diagram of one concrete embodiment of an electric circuit of the monostable multivibrator 68, which is used for setting the tension, and the phase comparator 69. A circuit 100 is a circuit equivalent to the monostable multivibrator 68. The circuit 100 includes an integrated circuit having an excellent temperature characteristic, so that any variation of atmospheric temperature does not result in a variation of the amount of delay. Such variation of delay in turn, changes the tension of the tape. An adjustment of the amount of delay of the circuit 100 is made by a control of a variable resistor R1, which is provided outside.

A signal made by a control of a variable resistor R1, which is provided outside the integrated circuit.

A signal is applied to the circuit 100 from a terminal 102. This signal passes through the circuit 100. After being inverted in an inverter 101, it is supplied to a bootstrap circuit 87 comprising transistors Q1, Q2, Q3, Q4 and Q5. This bootstrap circuit is a constant current type bootstrap circuit which is commonly used. The charge stored in a capacitor C3, through a switching action of the transistor Q1, is discharged by a constant amount through the transistor Q2. The degree of inclination of the slope of the output trapezoidal wave of the bootstrap circuit depends upon the amount of the discharge. This amount of the discharge may be changed by properly adjusting the resistance value of resistors R6 and R7. The transistors Q3, Q4 and Q5 perform the function of a buffer for reducing the output impedance. A trapezoidal wave formed in this bootstrap circuit is supplied to a sampling circuit 86 comprising diodes D1 to D6.

In the meanwhile, a signal selected by the mode selection relay contacts 70 (FIG. 6) is supplied through a terminal 103 to a sample pulse generating circuit 85 including the transistors Q6 and Q7 (FIG. 4). Since the sampling circuit 86 is a diode sampling circuit, sample pulses of both positive and negative polarities are produced in the sample pulse generating circuit 85. A sample pulse of negative polarity is drived from the collector of the transistor Q6 and a sample pulse of positive polarity is derived from the collector of the transistor Q7. These sample pulses are respectively supplied through diodes D5 and D6 to the sampling circuit. When a sample pulse is not applied to the diode sampling circuit 86, a reverse bias is applied to the diodes, thereby holding them in a non-conductive (open contact state). When a sample pulse by the positive bias is applied, the diodes become conductive (closed) state, and the potential at the cathode of the diode D3 becomes equal to the potential at the cathode of the diode D1. In other words, the potential of the trapezoidal wave signal is sampled only when the sample pulse is applied and appears at the cathode of the diode D3.

The voltage sampled in the sampling circuit 86 is stored on a hold capacitor C4 which is equivalent to a hold circuit 88 (FIG. 4). When the sample pulse is not applied to the sampling circuit, the diodes D3 and D4 are back biased, so that the impedances are high. An input impedance of a circuit 104 is also very high. Accordingly, the charge stored in the capacitor C4 is not discharged, but is held until the next pulse is applied. This held voltage is reduced in its output impedance in a buffer amplifier circuit 104 comprising an IC which corresponds to the buffer amplifier 89 and is sent to the next stage from an output terminal 105.

In case this circuit is used in the magnetic recording and reproducing apparatus for making a recording tape, the amount of the delay in the monostable multivibrator can be changed to compensate for changing the tension of the tape with time. The multivibrator delay is changed by connecting a resistor R25 in parallel with the variable resistor R1 and by changing the voltage applied from a terminal 106 with time.

The foregoing embodiment uses two capstans, i.e. a speed control capstan and a tension control capstan. The invention is not limited to this dual capstan system, but it is applicable to a magnetic recording and reproducing apparatus using only one capstan. In this case, a tension error voltage obtained as the output of the mixer 66 may be used as a voltage for controlling the brake of a reel motor. Or, this tension error voltage may be used as a voltage for controlling means which increases and decreases the tape running load so as to maintain the tention of the tape constant. Further, this invention is not limited to these embodiments. variations and modifications may be made without departing from the scope and spirit of the invention.

What I claim is:

1. A tape tension control system in a recording and reproducing apparatus, said system comprising a tape, a predetermined tape path over which said tape is transported through said apparatus, means including a transducing head for recording a desired information signal on and reproducing it from said tape, first and second capstan means respectively disposed adjacent said predetermined tape path on a tape supplying side and a tape taking up side relative to said transducing head, first control signal head means disposed between said transducing head and said first capstan and adjacent said predetermined tape path, second control signal head means disposed between said transducing head and said second capstan and also adjacent said predetermined tape path reference signal source means for supplying a reference signal, means responsive to said reference signal for forming cyclically recurring control signals, means comprising said first head for sequentially recording said control signals on said tape during recording of said information signal, first reproducing means for reproducing the control signals previously recorded on said tape by means of said first head during reproducing, second reproducing means for reproducing the control signals recorded by said first head during recording of said information signal and the control signals previously recorded during reproducing, first rotation detecting means for detecting the speed of rotation of said first capstan, second rotation detecting means for detecting the speed of rotation of said second capstan, first phase comparing means for comparing the phase of a signal obtained from said reference signal with the phase of the output of said first rotation detecting means during recording and with the phase of the reproduced control signal from said first reproducing means during reproducing, first control means for controlling the rotation of said first capstan responsive to the mixed outputs of said first phase comparing means and of said first rotation detecting means, second phase comparing means for comparing the phase of said reproduced control signal from said second reproducing means with the phase of the signal obtained from said reference signal during recording and with the phase of the reproduced control signal from said first reproducing means during reproducing, and a second controlling means for controlling the rotation of said second capstan responsive to the mixed outputs of said second phase comparing means and of said second rotation detecting means.

2. A tape tension control system in a recording and reproducing apparatus comprising a magnetic tape, means comprising a transducing head for recording an information signal on and reproducing said information signal from said magnetic tape, first and second capstan means for moving said magnetic tape past said transducing head along a predetermined tape path, said first and second capstan means being disposed respectively before and after said transducing head along the predetermined tape path, first and second driving means for rotating said first and second capstan means respectively, means for producing a cyclically recurring reference control signal, first magnetic head means disposed between said transudcing head and said first capstan along the predetermined tape path, means comprising said first magnetic head for recording said reference control signals on a track on said magnetic tape, second magnetic head means disposed between the transducing head and said second capstan along the predetermined tape path, means comprising said second magnetic head for reproducing the recorded reference control signal from said track, means for generating a signal synchronized with the revolution of said first capstan, first comparing means for comparing the phase of said reference control signal with that of said signal synchronized with the revolution of the first capstan and producing a first error signal in response to the phase difference between said reference control signal and said signal, first control means responsive to said first error signal for controlling the driving torque of said first driving means, delaying means for delaying the phase of the reference control signal reproduced by said reproducing means comprising said second magnetic head, second comparing means for comparing the phase of said reference control signal with that of the output signal of said delaying means and producing a second error signal in response to the phase difference between said reference control signal and the output signal of said delaying means, and second control means respnsive to said second error signal for controlling the driving torque of said second driving means.

3. The tape tension control system as defined in claim 2 wherein said first capstan is disposed on a tape supplying side and said second capstan is disposed on a tape taking up side at the ends of said tape path portion.

4.The tape tension control system as defined in claim 2 further comprising speed error detection circuit means responsive to the signal generated by said signal generating means for producing a speed error signal with respect to the revolution of said first capstan, and mixer means for mixing said first error signal with said speed error signal, said first control means for controlling the driving torque of said first driving means in response to the output signal of said mixer means.

5. The tape tension control system as defined in claim 4 further comprising means for generating a second signal synchronized with the revolution of said second capstan, second speed error detection circuit means responsive to said second signal for producing a second speed error signal with respect to the revolution of said second capstan, and second mixer means for mixing said second error signal with said second speed error signal, said second controlling means for controlling the driving torque of said second driving means in response to the output signal of said second mixer means.

6. The tape tension control system as defined in claim 2 wherein said tape is a tape on which no control signals have been recorded at the time of said recording and said control signals have been recorded on said tape at the time of reproducing, said system further comprising means for reproducing the control signals recorded on said tape by said first head, and means for connecting said first head to said recording means during recording and to said reproducing means during reproducing.

7. A tape tension control system in a recording and reproducing apparatus comprising means for producing a reference control signal, means for recording said reference control signal on a track on said magnetic tape, means comprising a transducing head for recording an information signal on and reproducing said information signal from said magnetic tape, first and second capstan means for controlling the movement of said magnetic tape past said transducing head along a predetermined tape path, said first and second capstan means being disposed respectively before and after said transducing head along the predetermined tape path, first and second driving means for rotating said first and second capstans respectively, first magnetic head means disposed between the transducing head and said first capstan in the predetermined tape path, first reproducing means comprising said first magnetic head for reproducing the recorded reference control signal from said track on said magnetic tape, second magnetic head means disposed between said transducing head and said second capstan means in the predetermined tape path, second reproducing means comprising said second magnetic head for reproducing the recorded reference control signal from said track, first comparing means for comparing the phase of said reference control signal produced by said control signal producing means with that of the reproduced reference control signal from said first reproducing means and producing a first error signal in response to the phase difference between said reference control signal and the reproduced reference control signal, first control means responsive to said first error signal for controlll-ing the driving torque of said first driving means, delaying means for delaying the phase of the reference control signal reproduced by said second reproducing means, second comparing means for comparing the phase of the reference control signal reproduced by said first reproducing means with the output signal of said delaying means and producing a second error signal in response to the phase difference between the reference control signal reproduced by said first reproducing means and the output signal of said delaying means, and second control means responsive to said second error signal for controlling the driving torque of said second driving means.

8. The tape tension control system as defined in claim 7 wherein said first capstan is disposed on a tape supplying side and said second capstan is disposed on a tape taking up side of the portion of said tape path.

9. The tape tension control system as defined in claim 7 further comprising means for generating a signal synchronized with the revolution of said first capstan, speed error detection circuit means responsive to the signal generated by said signal generating means for producing a speed error signal with respect to the revolution of said first capstan, and mixer means for mixing said first error signal with said speed error signal, said first control means for controlling the driving torque of said first driving means in response to the output signal of said mixer means.

10. The tape tension control system as defined in claim 9 further comprising means for generating a second signal synchronized with the revolution of said second capstan, second speed error detection circuit means responsive to said second signal for producing a second speed error signal with respect to the revolution of said second capstan, and second mixer means for mixing said second error signal with said second speed error signal, said second controlling means for controlling the driving torque of said second driving means in response to the output signal of said second mixer means.

* * * * *